United States Patent
Ueda et al.

(10) Patent No.: US 6,815,108 B2
(45) Date of Patent: Nov. 9, 2004

(54) FUNCTION MAINTAINING METHOD FOR A FUEL CELL SYSTEM

(75) Inventors: Kenichiro Ueda, Utsunomiya (JP); Shinji Yoshikawa, Utsunomiya (JP); Yoshinobu Hasuka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/723,941

(22) Filed: Nov. 26, 2003

(65) Prior Publication Data

US 2004/0161644 A1 Aug. 19, 2004

(30) Foreign Application Priority Data

Nov. 29, 2002 (JP) ........................................ 2002-347149

(51) Int. Cl.[7] .............................................. H01M 8/04
(52) U.S. Cl. ........................................... 429/25; 429/13
(58) Field of Search ..................................... 429/25, 13

(56) References Cited

U.S. PATENT DOCUMENTS

2003/0008185 A1 * 1/2003 Sugino et al. ................. 429/13
2004/0038098 A1 * 2/2004 Imamura et al. .............. 429/25

FOREIGN PATENT DOCUMENTS

JP   2001-295996     10/2001
JP   2003-308868   * 10/2003

* cited by examiner

*Primary Examiner*—John S. Maples
(74) *Attorney, Agent, or Firm*—Lahive & Cockfield, LLP; Anthony A. Laurentano, Esq.

(57) ABSTRACT

A function maintaining method for fuel cell system, the fuel cell system including a fuel cell that is supplied fuel and an oxidant to generate electricity, a fuel tank that supplies the fuel to the fuel cell, a tank pressure sensor that detects the pressure of the fuel tank, and a control apparatus that controls the same. The function maintaining method comprises calculating, when a failure of the tank pressure sensor has been detected, the pressure of the tank before a predetermined time interval from the time of this detection and a fuel consumption amount and fuel discharge amount after the detection of the failure, and estimation the pressure of the tank by using the same. A fuel cell system is obtained which can maintain the function and reliability of the fuel cell system.

7 Claims, 3 Drawing Sheets

FUNCTION MAINTAINING METHOD FOR A FUEL CELL SYSTEM

BACKGROUND OF THE INVENTION

1. Field of the Invention

The present invention relates to a function maintaining method for a fuel cell system used, for example, in a fuel cell vehicle.

2. Description of the Related Art

In a fuel cell mounted in a fuel cell vehicle, for example, an anode and a cathode that sandwich a solid polymer electrolyte membrane are provided, where the anode is supplied with a fuel gas (for example, hydrogen gas) and the cathode is supplied with an oxidant (for example, oxygen or air), and the electrochemical energy produced by the oxidization-reduction reaction of these gases is extracted as direct electrical energy.

As a fuel cell system that uses this type of fuel cell, there is a fuel cell system provided with a plurality of storage tanks (fuel tanks), and opening and closing valves are provided at respective flow inlets. A pressure sensor is installed along the flow path connected to the opening and closing valves, and by switching storage tanks depending on the pressure detected at the pressure sensor, the supply of hydrogen is carried out continuously (refer to Citation 1: Japanese Unexamined Patent Application, First Publication, No. 2001-295996).

However, when the pressure sensor fails, it is not possible to monitor the pressure of the fuel tank, and thus when generation of electricity continues as is, there is the concern that all of the fuel in the fuel tank will be consumed, and thus there is the problem that the function and reliability of the fuel cell system cannot be maintained, which is not desirable.

In consideration of the problem described above, it is an object of the present invention to provide a fuel cell system that can estimate the pressure of the fuel tank and can maintain the function and reliability of the fuel cell system even when the pressure sensor for the fuel tank has failed.

SUMMARY OF THE INVENTION

In order to attain the above object, according to the present invention, there is provided a function maintaining method for a fuel cell system, the fuel cell system including a fuel cell that is supplied fuel and an oxidant to generate electricity, a fuel tank that supplies the fuel to the fuel cell, a tank pressure sensor that detects a pressure of the fuel tank, comprising the steps of calculating, when a failure of the tank pressure sensor has been detected, the pressure of the tank before a predetermined time interval from the time of this detection and a fuel consumption amount and fuel discharge amount after the detection of the failure, and estimating the pressure of the tank according to the fuel consumption amount and the fuel discharge amount.

According to this invention, even in the case that a failure of the tank pressure sensor has been detected, the tank pressure of the fuel tank can be estimated by using the fuel consumption amount and the fuel discharge amount, and it is possible to estimate the remaining amount of fuel in the fuel tank thereby. Thus, it is possible to carry out control of the fuel cell depending on this estimated tank pressure, and at the same time, an operation that maintains the function of the fuel cell system becomes possible, and the function and reliability of the fuel cell system can be increased.

Preferably, the function maintaining method for a fuel cell system further comprises the step of stopping generation of electricity of the fuel cell when the estimated pressure of the tank becomes equal to or less than a predetermined value.

According to this invention, it is possible to operate the fuel cell in a state that reliably maintains fuel in the fuel tank at or above a constant amount, and thus the reliability of the fuel cell system can be increased.

Preferably, the fuel cell system further comprises a discharge valve that controls a fuel discharge amount of the fuel cell, and the fuel discharge amount is governed according to presence or absence of fuel discharge processing that opens the discharge valve.

According to this invention, by governing the fuel discharge amount depending on the presence or absence of fuel discharge processing, it is possible to estimate the pressure of the fuel tank with a higher precision, and thus a more precise control of the fuel cell becomes possible, and thereby the function and reliability of the fuel cell system can be improved.

Preferably, the fuel cell system further comprises a temperature sensor that detects a temperature of the fuel cell, and the fuel consumption amount and the fuel discharge amount are governed based on the temperature detected by the temperature sensor.

According to this invention, by governing the fuel consumption amount and the fuel discharge amount according to the temperature, it is possible to estimate the pressure of the fuel tank with a higher precision, and thus more precise control of the fuel cell becomes possible, and the function and reliability of the fuel cell system can be increased.

The above and other objects and features of the present invention will become more apparent from the following description taken in conjunction with the accompanying drawings.

PREFERRED EMBODIMENTS OF THE INVENTION

An embodiment of the fuel cell system according to the present invention will be described with reference to the drawings.

Figure 1:
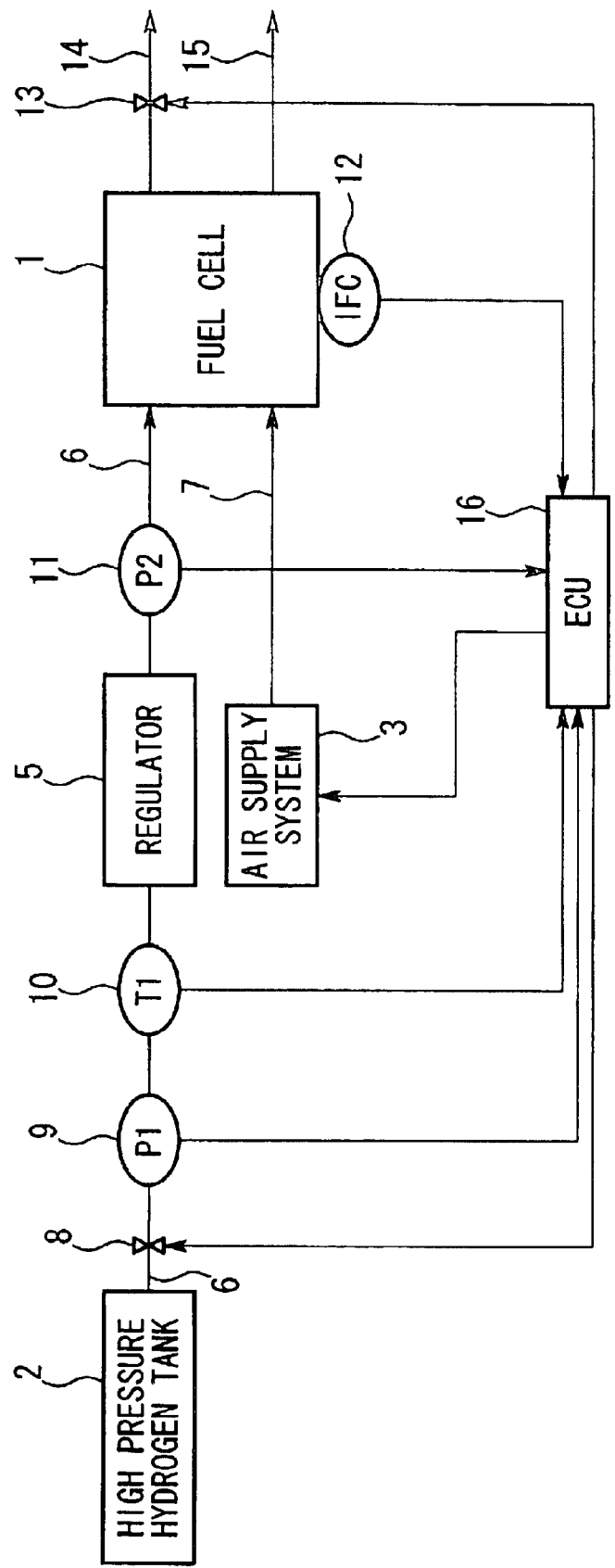
FIG. 1 is a schematic structural diagram showing the fuel cell system according to an embodiment of the present invention.

FIG. 1 is a schematic structural diagram of the fuel system in the embodiment of the present invention.

The fuel cell 1 is made up of a stack constructed by stacking in plurality cells that are formed by sandwiching a solid polymer electrolyte membrane made of a solid polymer ion exchange membrane or the like between an anode on one side and a cathode on the other side.

A high pressure hydrogen tank 2 is connected to the fuel cell 1 via a hydrogen gas supply path 6. The high pressure hydrogen tank 2 stores hydrogen, which is the fuel, and supplies the hydrogen gas to the anode of the fuel cell 1 via the hydrogen gas supply path 6.

In addition, an air supply system 3 is connected to the fuel cell 1 via an air supply path 7. The air supply system 3 is provided with an air supply source such as an air compressor, and provides air (the oxidizing gas) from the air supply source to the cathode of the fuel cell 1 via the air supply path 7.

In the fuel cell 1, when hydrogen gas is supplied to the anode as the fuel and air that includes oxygen is supplied to the cathode as the oxidant, hydrogen ions generated by a catalytic reaction at the anode migrate to the cathode by passing through the solid polymer electrolytic membrane and cause an electrochemical reaction with the oxygen at the cathode to thereby generate electricity, and water is generated.

After the hydrogen gas and air have been each used for electricity generation, they are each discharged as off gas respectively from a hydrogen gas discharge path 14 and an air discharge path 15.

In addition, a cutoff valve 8 and a regulator 5 are provided on the hydrogen gas supply path 6. By controlling the cutoff valve 8, the flow rate of the hydrogen supplied to the fuel cell 1 is adjusted. The regulator 5 carries out pressure control such that the hydrogen gas at the regulator 5 outlet is within a predetermined pressure range with respect to the air supplied to the fuel cell 1.

In addition, a tank pressure sensor 9 and a temperature sensor 10 are provided on the hydrogen gas supply path 6 between the cutoff valve 8 and the regulator 5, and these sensors 9 and 10 detect the hydrogen pressure P1 and the hydrogen temperature T1 of the hydrogen gas supplied from the tank 2. Additionally, an anode pressure sensor 11 is provided on the hydrogen gas supply path 6 between the regulator 5 and the fuel cell 1, and the pressure of the hydrogen gas supplied to the anode of the fuel cell 1 is detected by the sensor 11.

In addition, a discharge valve 13 is provided on the hydrogen gas discharge path 14, and hydrogen discharge process is carried out by the opening and closing of the discharge valve 13. A current sensor 12 is provided on the fuel cell 1, and the generated current IFC generated by the fuel cell 1 is detected by the sensor 12.

In addition, the fuel cell system is provided with a control apparatus (ECU: Electric Control Unit) 16. The ECU 16 controls the devices such as the air supply system 3, the cutoff valve 8, and the discharge valve 13 based on the detected values (P1, T1, P2, IFC) of each of the sensors 9, 10, 11, and 12.

The function maintenance control of the fuel cell system structured in this manner is described with reference to FIG. 2.

Figure 2:
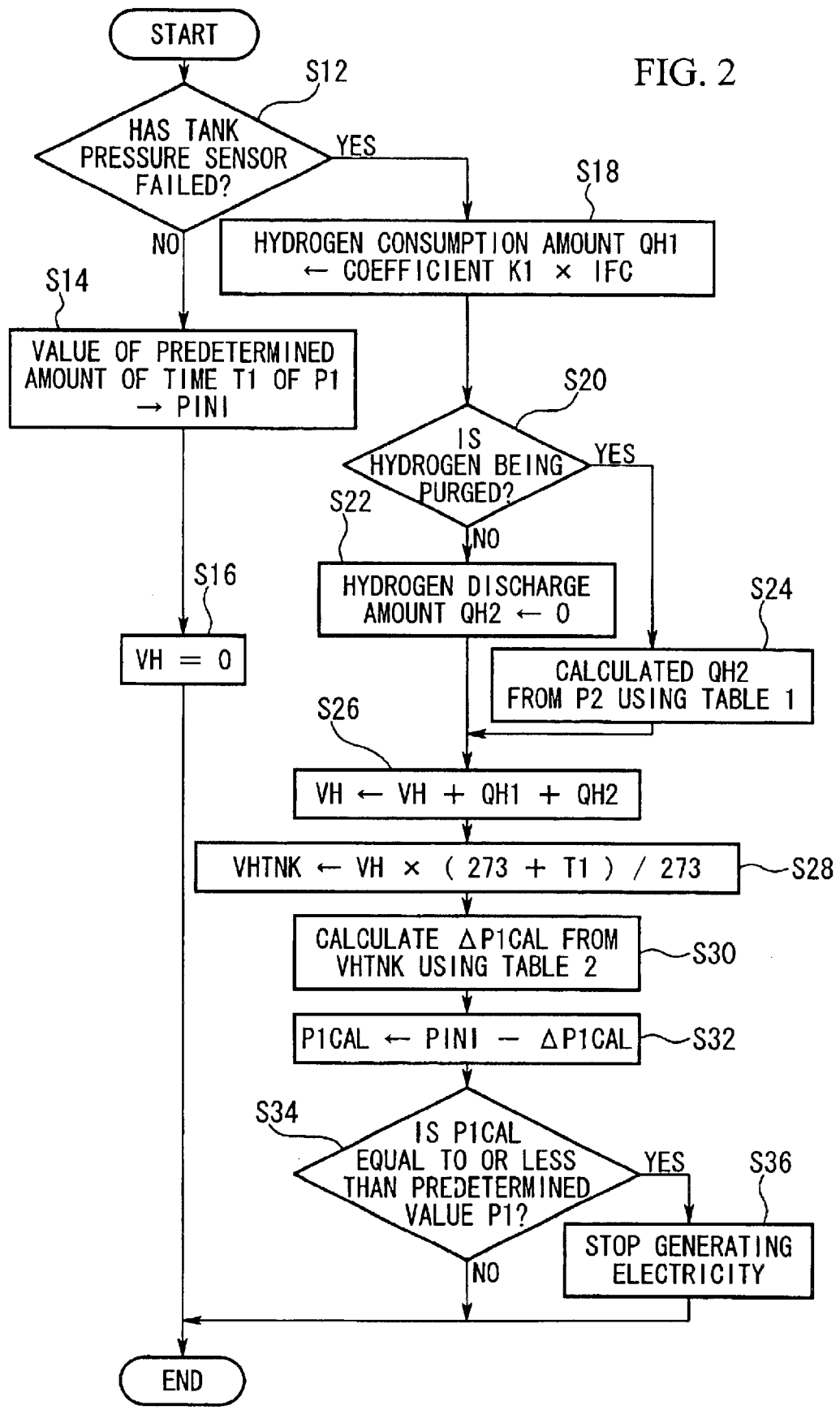
FIG. 2 is a flowchart showing the function maintaining control in the fuel cell system shown in FIG. 1.

FIG. 2 is a flowchart showing the control of the fuel cell system shown in FIG. 1. First, in step S 12, whether or not the tank pressure sensor 9 has failed is determined. In the case that the result of the determination is YES, the processing proceeds to step S 14, and in the case that the result of the determination is NO, the processing proceeds to step S 18. Whether or not the pressure sensor 9 has failed can be determined by the value of the signal voltage detected by the voltage sensor 9.

In step S 14, the value of the P1 before a predetermined time T1 is set to the initial pressure value PINI, and the processing proceeds to step S 16. In step S 16, the value of the total consumed amount VH is set to 0, and the processing sequence ends. This total consumed amount VH is the amount of hydrogen consumed after failure of the tank pressure sensor 9. This will be explained below.

In step S 12, when failure of the tank pressure sensor 9 has been detected, in step S 18 the generated hydrogen consumption amount QH1 is calculated. This is carried out by multiplying the generated current IFC detected by the current sensor 12 by the coefficient K1. Then the processing proceeds to step S 20, and whether or not hydrogen discharge processing is in progress is determined. This determination is carried out by detecting the opened or closed state of the discharge valve 13.

Figure 3:
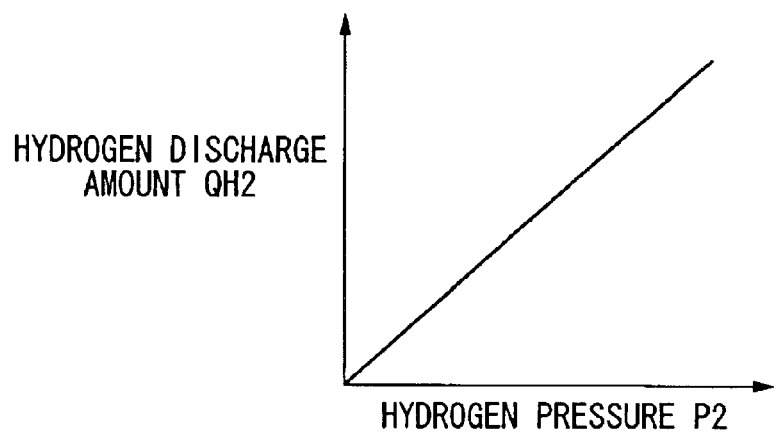
FIG. 3 is a graph showing the relation between the hydrogen discharge amount and the hydrogen pressure used in Table 1 in FIG. 2.

In the case that the result of the determination in step S 20 is YES (the case in which the discharge valve 13 is open), in step S 24, the hydrogen discharge amount QH2 from the anode pressure P2, which is detected by the anode pressure sensor 11, is calculated by using Table 1 (refer to FIG. 3), and the processing proceeds to step S 26.

Then, in the case that the result of the determination in step S 20 is NO (the case in which the discharge valve 13 is closed), hydrogen discharge processing is not in process, and in step S 26, 0 is substituted for the hydrogen discharge amount QH2, and the processing proceeds to step S 26.

The hydrogen (fuel) discharge amount is governed according to the result of such a determination.

In step S 26, the calculation of the total consumed amount VH is carried out. This is carried out by adding the generated hydrogen consumption amount QH1 and the hydrogen discharge amount QH2 to the total consumed amount VH. As described above, when calculating the total consumed amount VH, the hydrogen discharge amount QH2 is taken into account, and thus it is possible to increase the precision of the calculated total consumed amount VH, and a more precise control of the fuel cell 1 becomes possible depending on this.

Then in step S 28, the consumed amount VHTNK at the temperature T1 detected by the temperature sensor 10 is calculated from the total consumed amount VH using equation 1.

$$VHTNK = VHx(273+T1)/273 \qquad \text{Eq. 1}$$

Thereby, it is possible to calculate the total consumed amount (temperature compensation value) VHTNK that has had the temperature fluctuation taken into account, it is possible to increase the precision of the estimated hydrogen consumption amount, and thereby, it is possible to control more precisely the fuel cell 1 depending on this.

Figure 4:
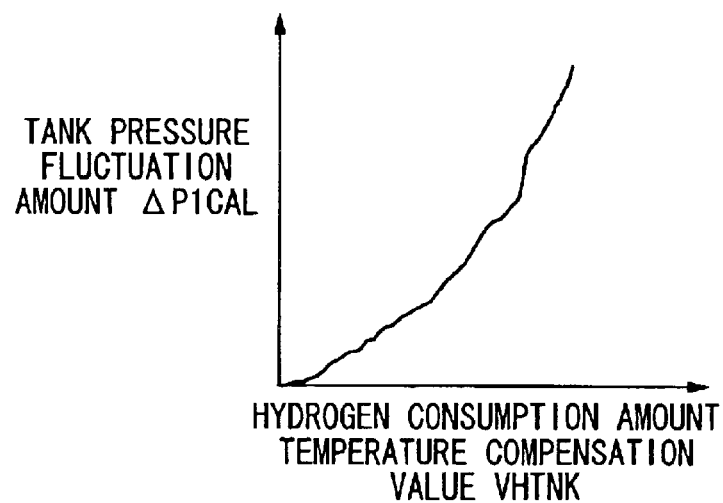
FIG. 4 is a graph showing the relationship between the tank pressure fluctuation amount and the hydrogen gas consumption amount temperature compensation value used in Table 2 in FIG. 2.

In step S 30, using Table 2 (refer to FIG. 4), the tank pressure fluctuation amount ΔP1CAL is calculated from the temperature compensation value VHTANK. In step S 32, the tank pressure fluctuation amount ΔP1CAL is subtracted from the initial pressure value PINI, and the compensation that calculates the estimated pressure value P1CAL is carried out.

Then in step S 34, whether or not the estimated pressure value P1CAL is equal to or less than a predetermined value (determination reference value) P1 is determined. Because the estimated pressure value and the tank hydrogen remaining amount are roughly proportional, if the result of the determination in step S 34 is YES, it is estimated that the tank hydrogen remaining amount is small, and thus in step S 36 the electrical generation is stopped, and the processing sequence ends. In addition, if the result of the determination in step S 34 is NO, it is estimated that the tank hydrogen remaining amount is sufficient, and the processing sequence ends with the electricity generation continuing.

In this manner, the hydrogen in the hydrogen tank 2 is reliably maintained equal to or greater than a constant amount, and thereby the reliability of the fuel cell system can be increased.

Moreover, the fuel cell system in the present invention is not limited to the embodiment described above. In addition, the fuel cell system can be suitably used in a fuel cell vehicle, but of course it can be applied to other uses, such as in a motorcycle or robot having a fuel cell mounted, or a stationary or portable fuel cell system.

What is claimed is:

1. A function maintaining method for a fuel cell system, the fuel cell system including a fuel cell that is supplied a fuel and an oxidant to generate electricity, a fuel tank that supplies the fuel to said fuel cell, and a tank pressure sensor that detects a pressure of said fuel tank, comprising the steps of:

calculating, when a failure of said tank pressure sensor has been detected, the pressure of the fuel tank before a predetermined time interval from the time of the failure of said tank pressure sensor, and a fuel consumption amount and a fuel discharge amount after the detection of said failure, and estimating the pressure of the fuel tank according to said fuel consumption amount and said fuel discharge amount.

2. A function maintaining method for a fuel cell system according to claim 1, further comprising the step of stopping generation of electricity by said fuel cell when the estimated pressure of the fuel tank becomes equal to or less than a predetermined value.

3. A function maintaining method for a fuel cell system according to claim 1, wherein said fuel cell system further comprises a discharge valve that controls a fuel discharge amount of the fuel cell, and wherein said fuel discharge amount is governed according to presence or absence of fuel discharge processing that opens said discharge valve.

4. A function maintaining method for a fuel cell system according to claim 1, wherein said fuel cell system further comprises a temperature sensor that detects a temperature of said fuel cell, and wherein said fuel consumption amount and said fuel discharge amount are governed based on the temperature detected by said temperature sensor.

5. A function maintaining method for a fuel cell system according claim 1, further comprising the step of controlling the fuel discharge amount from said fuel cell.

6. A function maintaining method for a fuel cell system according claim 1, further comprising the step of detecting a temperature of said fuel cell.

7. A function maintaining method for a fuel cell system according to claim 6, further comprising the step of controlling the fuel discharge amount in response to the temperature of the fuel cell.

* * * * *